Patented July 18, 1950

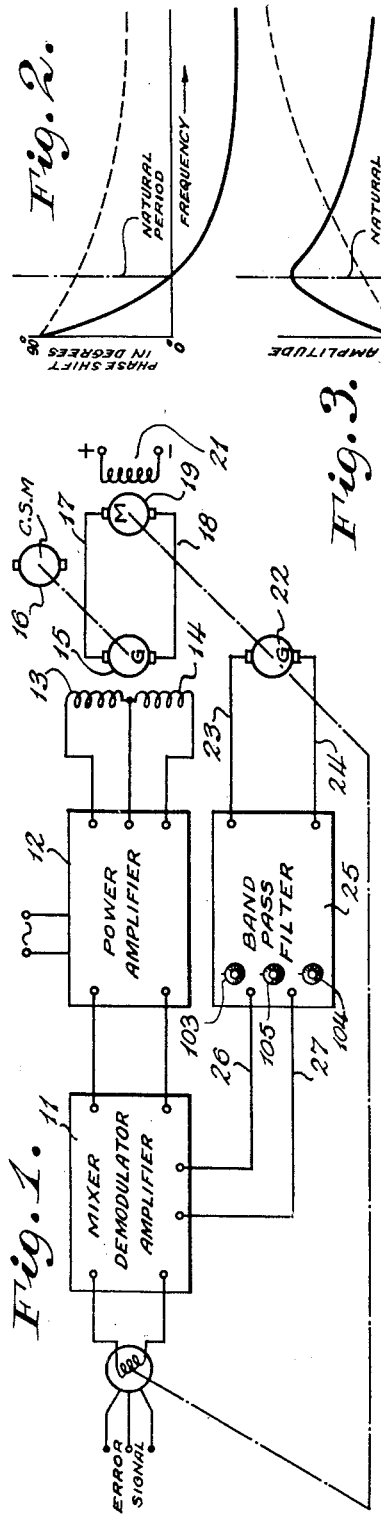

2,515,249

UNITED STATES PATENT OFFICE 2,515,249

SERVOMOTOR SYSTEM

Rawley D. McCoy, Bronxville, N. Y., assignor to The Sperry Corporation, a corporation of Delaware Application April 26, 1947, Serial No. 744,052

10 Claims. (Cl. 318—30)

This invention relates to servomotor systems, and more particularly, to servomotor systems having a speed signal feed-back circuit for damping and stabilizing servomotor operation.

There are various methods known to the art for damping or stabilizing servomotor operation in servo systems that are employed to move or rotate a remote object in accordance with motion or rotation of a reference device. To prevent speed lag, filter networks have been proposed such as those using blocking condensers to prevent speed voltage feedback under constant speed conditions. It has also been proposed to use high-pass filters which prevent feedback at substantially constant speeds, or zero frequency, and which function to pass more speed voltage with high frequencies.

In feed-back networks having blocking condensers (for example, a R-C filter, or a high-pass filter), the output therefrom generally provides a feedback of substantially zero amplitude at zero oscillating frequency, and gradually increases in amplitude with increase in the frequency of oscillation. However, in certain applications, such as might include loads of varying inertia, or such as might require high torque output for the movement of large loads, it is desirable that the output of the feed-back circuit build up to be of a maximum amplitude at the undamped natural frequency of the system, thereby greatly improving servomotor operation in a manner to prevent hunting and otherwise stabilize the system.

Inasmuch as the response amplitude of the feed-back circuit is primarily dependent upon the phase shift characteristic of the filter circuit, the effect that the large phase shift produces in an R-C or high-pass network at the lower oscillating frequencies is such as to render the speed signal less effective insofar as affording stability to the system is concerned. The reason for this change in effectiveness being that, in the event a phase shift is created in the feed-back circuit, the speed signal, having a large out-of-phase component, then reacts in a manner similar to the reaction normally produced by an acceleration signal, which latter signal is relatively ineffective in affording stability to the servomotor system.

It is therefore a primary object of the instant invention to provide, in a servo system, a feed-back network having a maximum degenerative output at the undamped natural frequency of the servomotor system, or, more generally, having a maximum feedback over the range of frequencies at which the servo system tends to hunt.

Also an object is to provide a feed-back network having a zero speed signal feedback at constant speed of the servo motor.

Therefore it is a feature of this invention to provide, in a servomotor system, a feed-back network including a band-pass filter having a minimum phase shift characteristic in the frequency range in which the servo system normally tends to hunt.

Another feature of this invention is to provide a servomotor system with a feed-back circuit having a minimum attenuation at substantially the natural undamped frequency of the servomotor system.

The invention also relates to the novel features or principles of the instrumentalities described herein, whether or not such are used for the stated objects, or in the stated fields or combinations.

Other objects and advantages will become apparent from the following description taken in connection with the accompanying drawings, wherein:

Fig. 1 illustrates a block diagram of the instant invention;

Figs. 2 and 3 illustrate graphically certain servomotor characteristics; and

Fig. 4 sets forth in detailed form the component parts of Fig. 1.

Referring now to Fig. 1, a source of error signal is illustrated as being supplied to the mixer modulator amplifier 11 whereupon, after being demodulated in a manner to be later described in detail, the output signal is further amplified in power amplifier 12. The output from the power amplifier 12 is, in this instance, applied to the windings 13 and 14 of generator 15, which generator is connected in a typical Ward-Leonard arrangement. The constant speed motor 16 is operatively connected to drive generator 15 thereby creating a reversible polarity voltage across the lines 17 and 18 which current is of a magnitude and sense that is in accordance with the signals from the power amplifier 12. Motor 19, having a fixed D. C. field 21, has its armature supplied by the generator 15. Motor 19 also serves to drive a load (not shown), which load may be driven by virtue of the system described, to a position or speed in accordance with the error signal that was originally applied to the mixer demodulator 11. A repeat-back system, which may take any of the several well known configurations (and is therefore not illustrated) may be included between the load or servomotor output and the error signal source.

A speed signal that is proportional to the speed of the motor 19 may be obtained by means of the generator 22 which generator may be directly associated to be driven by the motor 19. This speed signal is produced by the generator 22 and appears across the lines 23 and 24. Devices other than the permanent magnet type tachometer would provide an adequate speed signal but the generator herein illustrated presents a preferable embodiment. The unidirectional speed signal voltage on lines 23 and 24 is connected to feed into a band-pass filter 25 which is arranged to have a minimum attenuation or a maximum degenerative signal feedback in the frequency range in which the servo system tends to hunt. The frequency range in which the servo system tends to hunt is sometimes referred to as the natural undamped frequency of the servo system. Additionally, the band-pass filter (to be described more fully later) may be designed to provide zero phase shift of the input signal at the natural undamped frequency, and applies the speed signal in a degenerative sense to the mixer demodulator 11 across the lines 26, 27. In this manner, during periods of steady operation, that is, during time intervals that are free from oscillation (or these intervals may be termed periods at which the frequency of the servo system is zero), the band-pass filter prevents any speed signal from acting degeneratively on the mixer demodulator. It is only during periods of oscillation and, more specifically, during oscillations at the undamped natural period of the system that the band-pass filter provides a maximum degenerative feedback and therefore has a maximum effect in affording stability by damping servomotor operation.

The amplitude and phase shift characteristics of the R-C, and band-pass filter, types of feedback networks are illustrated in Figs. 2 and 3, respectively, the amplitude and phase shift curves being plotted against the frequency of oscillation of the servomotor system. In Fig. 2, the solid curve illustrates the manner in which phase shift varies for various frequencies of oscillation of the servomotor system. The maximum oscillating frequency normally encountered in most systems is in the order of 8 to 10 cycles per second, while the undamped natural frequency of oscillation (i. e., the frequency at which the system tends to hunt), may be in the neighborhood of 1 or 2 cycles per second. In the range of the undamped natural frequency, in which the system is in critical need of a maximum degenerative feedback, the feedback must have as small an out-of-phase component as is possible in order that the degenerative effect of a feedback be a maximum. In providing a system having a zero phase shift at a natural frequency, the band-pass filter will transmit signal components that are proportional to motor speed alone, thereby rendering the effective feed-back signal independent of the components that tend to vary with variations in the torque output of the motor or inertia of the load. It is well-known that a feed-back signal that is responsive to motor torque or inertial variations of the load is not an effective signal insofar as stabilizing motor systems is concerned. This type of torque-responsive signal or inertia-responsive signal is the type that may be produced in systems wherein the speed signal is derived from the armature voltage of the servomotor and it is in this type of circuit that the band-pass filter in the feedback network becomes even more desirable. The high-pass filter will not provide a zero phase shift at normal operating frequencies but has a 90° phase shift at zero frequency, the amount of phase shift gradually declining to approximately 30° at the highest frequencies normally encountered, and therefore can never provide the stability to the system that the band-pass filter of the present invention would provide. In systems having a band-pass filter, the gain or amplitude is at a maximum value in the critical oscillating frequency of the servo system, as illustrated by the solid line of Fig. 3. The dotted line of Fig. 3 illustrates corresponding characteristics for a high-pass filter and from these curves the inadequacies of high-pass filters in the above-mentioned respects become obvious.

In Fig. 4, fine and coarse signals (as may be derived from a standard Selsyn, or other similar system) may be applied to the two pairs of input terminals 51, 52 and 53, 54, respectively. The fine signal being applied across the input terminals 51 and 52, is limited in magnitude by means of the series resistor 55 and is clipped by the shunt transformer 56 arranged with a neon tube 57 connected across the secondary of the transformer 56.

The coarse signal, applied to the input terminals 53 and 54 is added to the fine signal that is applied to the input terminals 51 and 52 and together the fine and coarse signals are applied to the primary of the input transformer 59. A constant amplitude A. C. voltage, sometimes called an "anti-stick off" voltage, which, more specifically, is used for preventing synchronization at 180° out-of-synchronous position, is supplied from transformer 58 through its associated phase-shifting circuit and combined with the fine and coarse signals. This circuit is conventional and is well known to those familiar with Selsyn mixing circuits. The secondary of the input transformer 59, upon receiving the fine and coarse signals as heretofore illustrated, applies the added Selsyn signals to the grids 61, 62, 63 and 64 of the electron tubes 65 and 66 as illustrated. The grid 61 is connected in opposite phase relation to grid 62, and a similar relation exists between grids 63 and 64. The feed-back signal obtained from lines 67 and 68 is combined algebraically with the error signals at the grid return points of the tubes 65 and 66. The manner of obtaining this speed voltage will be described in detail later. The alternating current plate voltages for the mixer demodulator tubes 65 and 66 are obtained from the transformer 69 which is excited from an A. C. reference source that may be employed for Selsyn transmitter excitation for phase sensitive operation. The output of the mixer demodulator is taken from the two center tap points 71 and 72, on the alternating current plate windings of the secondaries of transformer 69, and this D. C. output signal is filtered by means of the shunt condensers 73 and 74 and the series chokes 75, 76 in circuit with condensers 77, 78. The resistors 81 and 82 provide an output load for the mixer demodulator.

The power amplifier includes the tubes 83 and 84 connected as a push-pull D. C. power amplifier. The plate currents of tubes 83 and 84 flow through the center tapped field windings 13 and 14 of the generator 15 and thereby determine the magnitude and direction of the D. C. output voltage of the generator 15. Resistors 85 and 86 along with condensers 87 and 88 are connected in shunt with the two halves of the generator field windings 13 and 14, respectively, to oppose high frequency oscillation of the amplifier, and to guard the field windings 13 and 14 from extremely high voltages or surges that might occur due to sudden changes in input signals. The grids 91 and 92 of the tubes 83 and 84 are provided with D. C. signal voltages from the load resistors 81 and 82 of the mixer demodulator 11. The screen grid supply voltage for the tubes 83 and 84 is dropped to a safe value from the plate supply voltage by the resistor 89. Suitable grid bias for the power amplifiers is obtained from series-connected resistors 93 and 94 in the cathode return of the tubes 83 and 84. The center-tapped field windings 13 and 14 are connected to the output points 95, 96 and 97 and the remainder of the system operates as outlined in Fig. 1. However, the speed signal generator 22 is arranged to transmit a speed signal along the lines 23 and 24 to the band-pass filter 25 which includes the series resistors 101, 102, the series condensers 103 and 104 and the series connected shunt condensers and resistors 105, 106, respectively. This band-pass filter is, in this particular embodiment, tuned to provide the maximum degenerative feedback of the speed voltage, across the lines 67 and 68, at the natural undamped frequency of the servomotor system, thereby providing maximum damping in the frequency range in which the system would normally tend to hunt and maximum stability is thereby afforded to the servomotor system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a servomotor system, a motor, a source of control signal voltage, amplifier means for controlling the rate and direction of operation of said motor in accordance with the magnitude and polarity sense of said signal, means for deriving a unidirectional voltage having a magnitude proportional to the speed of the motor and a polarity dependent upon the direction of motor operation, and a feed-back circuit connecting said speed-voltage-producing means in degenerative fashion to said amplifier, said circuit including a band-pass filter arranged to transmit maximum feedback to said amplifier over the range of frequencies at which the servo system tends to hunt.

2. In a servomotor system, a motor, a source of control signal, amplifier means for controlling the rate and direction of operation of said motor in accordance with the magnitude and polarity sense of said signal, means for deriving a unidirectional voltage having a magnitude proportional to the speed of the motor and a polarity dependent upon the direction of motor operation, and a feed-back circuit connecting said speed-voltage-producing means in degenerative fashion to said amplifier, said circuit including a band-pass filter arranged to transmit maximum feedback to said amplifier at substantially the natural frequency of oscillation of said servo system.

3. In a servomotor system, a motor, a source of control signal voltage, amplifier means for controlling the operation of said motor in accordance with said signal, voltage-producing means having an output proportional to motor speed, and circuit means connecting the output from said voltage-producing means to said amplifier, said circuit means including a band-pass filter having a minimum attenuation at substantially the frequency at which the servo system tends to hunt.

4. In a servomotor system, a motor, a source of control signal voltage, amplifier means for controlling the operation of said motor in accordance with said signal, voltage-producing means having an output proportional to motor speed, and circuit means connecting said voltage-producing means to said amplifier, said circuit means including a band-pass filter having a substantially zero phase-shift characteristic at the natural frequency of the servo system.

5. In a servomotor system, a motor, a source of control signal, amplifier means for controlling the operation of said motor in accordance with said signal, a speed signal generator operatively associated with said motor and responsive to motor speed, a band-pass filter arranged to receive said speed signal and to transmit to the amplifier a feed-back signal having a zero phase-shift characteristic and a maximum degenerative feedback at the natural frequency of the servo system.

6. In a servo system, a motor, a source of control signal voltage, amplifier means for controlling the operation of said motor in accordance with said signal, speed-voltage-producing means associated with said motor responsive to the speed thereof, and circuit means including a band-pass filter comprising a resistance-capacitance network arranged to transmit maximum degenerative feedback substantially without phase shift of said speed voltage to said amplifier at the natural frequency of said servo system.

7. In a servomotor system, a motor, a control signal, amplifier means for said signal, a generator driven by said motor for producing a unidirectional voltage having a magnitude proportional to motor speed, and a feed-back circuit connecting said speed voltage in degenerative fashion to said amplifier, said circuit including a band-pass filter arranged to transmit maximum feedback to said amplifier over the range of frequencies at which the servo system tends to hunt.

8. In a servomotor system, a motor, operating means for said motor including a control signal therefor, generator means driven by said motor for producing a voltage having a magnitude proportional to motor speed, and circuit means connecting said speed voltage in degenerative manner to said operating means, said circuit means including a band-pass filter having a maximum amplitude at the frequency at which the servo system normally tends to hunt.

9. In a servomotor system, a motor, control means for said motor, means for producing a voltage proportional to motor speed, a band-pass filter having a maximum amplitude at the frequency at which the servo system normally tends to hunt, and circuit means for interconnecting said band-pass filter and said speed voltage with said control means.

10. In combination with a servomotor system speed signal generator and mixer amplifier, a feedback network for supplying a signal from said speed signal generator to said mixer amplifier, said feedback network including a substantially-zero-phase-shift-at-servo-system-natural-frequency band-pass filter, and a circuit connecting said filter to said signal generator and to said amplifier whereby the maximum feedback signal substantially without phase shift is transmitted from said signal generator to said amplifier at the natural frequency of said servo system.

RAWLEY D. McCOY.

REFERENCES CITED

The following references are of record in the file of this patent:

UNITED STATES PATENTS

| Number | Name | Date |
|---|---|---|
| 2,401,421 | Hahn | June 4, 1946 |
| 2,408,068 | Hull et al. | Sept. 24, 1946 |
| 2,414,102 | Hull et al. | Jan. 14, 1947 |
| 2,423,438 | Dawson | July 8, 1947 |

OTHER REFERENCES

Article, "Theory of Servo Systems, with Particular Reference to Stabilization," by A. L. Whiteley, Institution of Electrical Engineers, Journal, vol. 93, No. 34, part II (Power Eng.), August 1946, pp. 353–367 (discussion pp. 368–372).